(12) United States Patent
Baskett et al.

(10) Patent No.: US 10,474,652 B2
(45) Date of Patent: Nov. 12, 2019

(54) OPTIMIZING WIDE DATA-TYPE STORAGE AND ANALYSIS OF DATA IN A COLUMN STORE DATABASE

(71) Applicant: INPIXON, Palo Alto, CA (US)

(72) Inventors: Chris Baskett, Belmont, CA (US); Tony Faustini, Berkeley, CA (US)

(73) Assignee: INPIXON, Palo Alto, CA (US)

( * ) Notice: Subject to any disclaimer, the term of this patent is extended or adjusted under 35 U.S.C. 154(b) by 0 days.

(21) Appl. No.: 14/218,859

(22) Filed: Mar. 18, 2014

(65) Prior Publication Data
US 2014/0304275 A1    Oct. 9, 2014

Related U.S. Application Data

(60) Provisional application No. 61/784,921, filed on Mar. 14, 2013.

(51) Int. Cl.
*G06F 16/00* (2019.01)
*G06F 16/22* (2019.01)
(Continued)

(52) U.S. Cl.
CPC .......... *G06F 16/221* (2019.01); *G06F 16/137* (2019.01); *G06F 16/22* (2019.01);
(Continued)

(58) Field of Classification Search
CPC ......... G06F 17/30306; G06F 17/30327; G06F 17/30339; G06F 17/30421; G06F 17/30619; G06F 17/30634; G06F 17/30471; G06F 17/30985; G06F 17/30324; G06F 16/137; G06F 16/152; G06F 16/2255;
(Continued)

(56) References Cited

U.S. PATENT DOCUMENTS 5,771,010 A * 6/1998 Masenas ............. H03M 7/3086
341/106
5,794,228 A * 8/1998 French .............. G06F 17/30324
(Continued)

OTHER PUBLICATIONS

Prasanna Ganesan et al., "Online Balancing of Range-Partitioned Data with Applications to Peer-to-Peer Systems", Proceedings of the 30th VLDB Conference, 2004, pp. 1-12.*
(Continued)

*Primary Examiner* — Srirama Channavajjala
(74) *Attorney, Agent, or Firm* — Pillsbury Winthrop Shaw Pittman, LLP

(57) ABSTRACT

Data structures can provide for a column store of a database table. Methods can use the data structures for efficiently responding to a query. Unique field values of a column of a database table can be identified. The unique values can be stored in a dictionary table along with reference keys that point to a row of the database table. A reference store column can replace the original column, where the reference store column stores index values of the dictionary table. A hash table can be used in accessing the database. A hash function can provide a hash value of a query term, and the hash value can be used to access a hash table to obtain a stored value of an index value of the dictionary table. The index value can be used to access the dictionary table to obtain reference keys corresponding to rows of the database table.

26 Claims, 7 Drawing Sheets

(51) Int. Cl.
  *G06F 16/13* (2019.01)
  *G06F 16/242* (2019.01)
  *G06F 16/901* (2019.01)
  *G06F 16/31* (2019.01)
  *G06F 16/28* (2019.01)
  *G06F 16/33* (2019.01)
(52) U.S. Cl.
  CPC ...... *G06F 16/2228* (2019.01); *G06F 16/2255* (2019.01); *G06F 16/2423* (2019.01); *G06F 16/284* (2019.01); *G06F 16/31* (2019.01); *G06F 16/3331* (2019.01); *G06F 16/3338* (2019.01); *G06F 16/9014* (2019.01)
(58) Field of Classification Search
  CPC .... G06F 16/325; G06F 16/9014; G06F 16/22; G06F 16/2228; G06F 16/31; G06F 16/316; G06F 16/3331; G06F 16/3338; G06F 16/2423; G06F 16/284; H03M 7/3084; H03M 7/3088; H03M 7/3095; H03M 7/4093
  See application file for complete search history.

(56) References Cited

U.S. PATENT DOCUMENTS

| | | | | |
|---|---|---|---|---|
| 2002/0059281 A1* | 5/2002 | Watanabe | ......... | G06F 17/30625 |
| 2003/0112742 A1* | 6/2003 | Piper | ................ | G06F 17/30445 370/200 |
| 2005/0210151 A1* | 9/2005 | Abdo | .................. | H03M 7/3086 709/247 |
| 2005/0223032 A1* | 10/2005 | Shan | .................. | G06F 17/30569 |
| 2006/0271540 A1* | 11/2006 | Williams | .......... | G06F 17/30067 |
| 2007/0112795 A1* | 5/2007 | Travison, Jr. | ..... | G06F 17/30327 |
| 2008/0021908 A1* | 1/2008 | Trask | ................ | G06F 17/30949 |
| 2008/0222136 A1* | 9/2008 | Yates | ................ | G06F 17/30321 |
| 2009/0254532 A1* | 10/2009 | Yang | ................ | G06F 17/30315 |
| 2011/0246503 A1* | 10/2011 | Bender | ............ | G06F 17/30306 707/769 |
| 2013/0086353 A1* | 4/2013 | Colgrove | .............. | G06F 3/0608 711/206 |
| 2013/0151502 A1* | 6/2013 | Yoon | ................ | G06F 17/30315 707/714 |
| 2014/0280024 A1* | 9/2014 | Baskett | ............ | G06F 17/30498 707/714 |

OTHER PUBLICATIONS

Ewa Orlowska et al., "relational methods for computer science applications", 2001, pp. 32-33.*

Bertino,et al., (hereafter Bertino,), "Towards optimal indexing for segment databases", international conf. advances in database technology, EDBT'98, pp. 39-53 published 1998.*

Bertino,et al., "Towards optimal indexing for segment databases", international conf. advances in database technology, EDBT'98 pp. 39-53 published 1998.*

* cited by examiner

| 110 | 120 |
| --- | --- |
| Implicit Array Index | Varchar Field Value |
| 1 | Orange |
| 2 | Yellow |
| 3 | Orange |
| 4 | Red |
| 5 | Blue |
| 6 | Red |
| 7 | Red |

FIG. 1A ⟵ 100

| 140 | 150 | 160 |
| --- | --- | --- |
| Implicit Array Index | Varchar Field Value | Reference Keys |
| 1 | Blue | [5] ⟵ 161 |
| 2 | Orange | [1,3] |
| 3 | Red | [4,6,7] |
| 4 | Yellow | [2] |

FIG. 1B ⟵ 130

| 180 | 190 |
| --- | --- |
| Implicit Array Index | Varchar Field Value |
| 1 | 2 |
| 2 | 4 |
| 3 | 2 |
| 4 | 3 |
| 5 | 1 |
| 6 | 3 |
| 7 | 3 |

| Implicit Array Index | Varchar Field Value |
|---|---|
| 1 | hello |
| 2 | happy people |
| 3 | hello |
| 4 | the quick brown fox and that cat |
| 5 | hello |
| 6 | the elephant that flew the nest |

300

340   350   360

| Implicit Array Index | Varchar Field Value | Reference Keys |
|---|---|---|
| 1 | Happy people | [2] |
| 2 | Hello | [1, 3, 5] |
| 3 | the elephant that flew the nest | [6] |
| 4 | the quick brown fox and that cat | [4] |

| Implicit Array Index | Varchar Field Value | Reference Keys |
|---|---|---|
| 1 | and | [1] |
| 2 | brown | [4] |
| 3 | cat | [4] |
| 4 | elephant | [6] |
| 5 | flew | [6] |
| 6 | fox | [4] |
| 7 | happy | [2] |
| 8 | hello | [1],[3],[5] |
| 9 | people | [2] |
| 10 | quick | [4],[6] |
| 11 | that | [6] |
| 12 | the | [4],[6] |

↙ 400

| Implicit Array Index | Varchar Field Value |
|---|---|
| 1 | 2 |
| 2 | 1 |
| 3 | 2 |
| 4 | 4 |
| 5 | 2 |
| 6 | 3 |

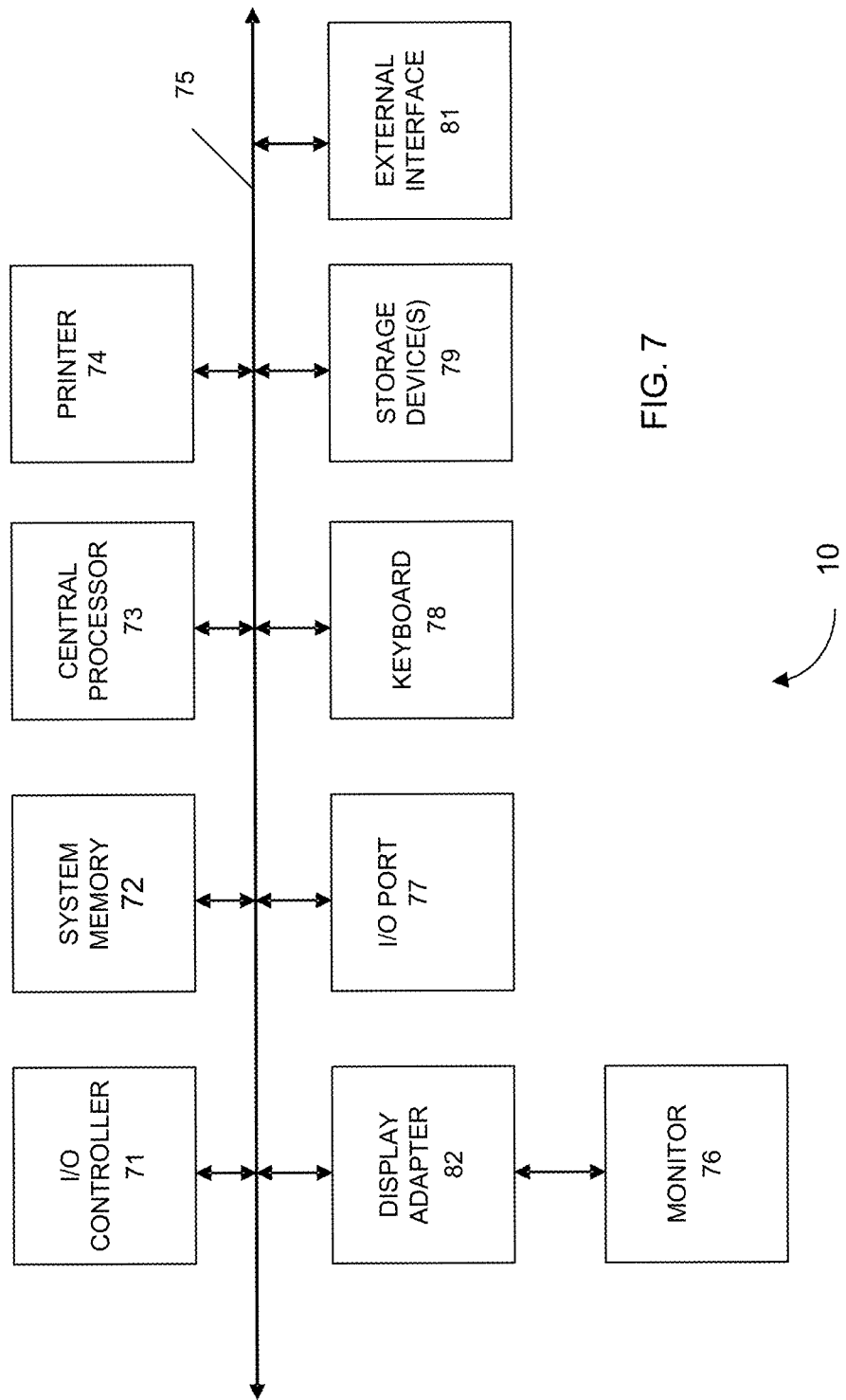

OPTIMIZING WIDE DATA-TYPE STORAGE AND ANALYSIS OF DATA IN A COLUMN STORE DATABASE

CROSS-REFERENCES TO RELATED APPLICATIONS

The present application claims priority from and is a nonprovisional application of U.S. Provisional Application No. 61/784,921, entitled "Systems And Methods To Optimize Wide Data-Type Storage And Analysis Of Data In A Column Store Database" filed Mar. 14, 2013, the entire contents of which are herein incorporated by reference for all purposes.

BACKGROUND

Column store databases can be more efficient for data analysis than row store databases, particularly when retrieval consists of a small percentage of the overall number of columns in a particular table. Column store use has proliferated in recent years, and people are beginning to optimize them at deeper and deeper levels. However, storage of column stores can still be inefficient.

Embodiments of the present invention can address these and other problems.

BRIEF SUMMARY

Embodiments of the present invention can provide data structures for performing column store of a database table and methods of using the data structures for efficiently responding to a query. For example, unique values of variable character fields (or other types of data) of a column of a database table can be identified. The unique values can be stored in a dictionary table along with reference keys that point to a row of the database table. A new reference store column can replace the original column, where the reference store column stores index values of the dictionary table.

In some embodiments, a hash table can be used in accessing the database. A hash function can provide a hash value of a query term (e.g., a varchar), and the hash value can be used to access a hash table to obtain an index value of the dictionary table. The index value can be used to access the dictionary table to obtain reference keys for the database table.

Other embodiments are directed to systems, portable consumer devices, and computer readable media associated with methods described herein.

BRIEF DESCRIPTION OF THE DRAWINGS

FIG. 1A shows a column 120 of a table 100 that may be improved with embodiments of the present invention.

FIG. 1B is a dictionary table 130 according to embodiments of the present invention.

FIG. 1C is a reference store table 170 illustrating a reference store column 190 according to embodiments of the present invention.

FIG. 4A shows a compression table 400 according to embodiments of the present invention.

FIG. 4B shows a reference store table 450 corresponding to dictionary table 330 according to embodiments of the present invention.

FIG. 7 shows a block diagram of an example computer system 300 usable with system and methods according to embodiments of the present invention.

DETAILED DESCRIPTION

Figure 2:
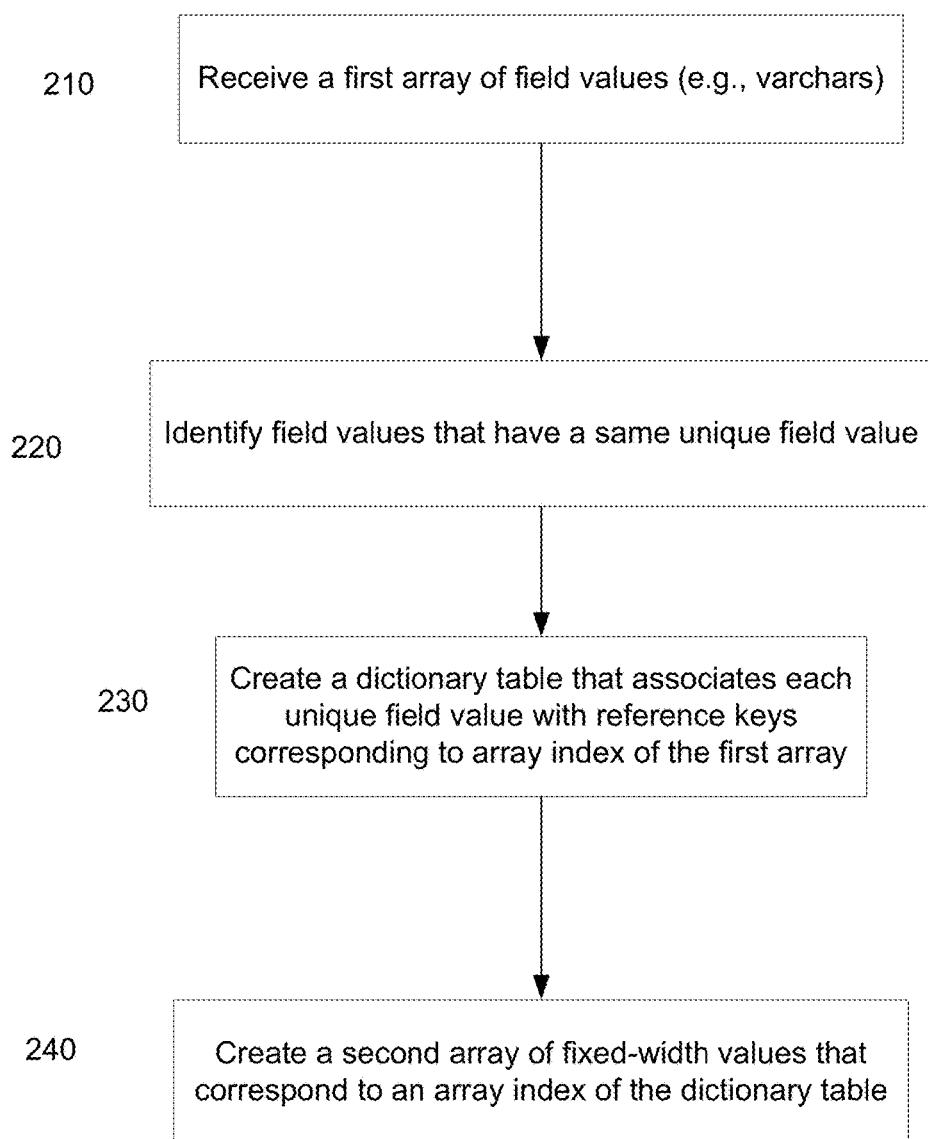
FIG. 2 is a flowchart of a method 200 for storing variable-width data in a database. Method 200 can be performed by a computer system that is in indication that the database.

There are imperatives for architecture when it comes to column store fixed-width data types. But when the requirement is to store a variable-length data type, things become more complex. For example, array alignment is difficult to do without incurring a large amount of empty-space overhead. An array is usually a fixed block of memory in which items are stored. For it to be an array, the items usually have the same size so the structure can be indexed. If one stores variable length items then one can only make them fixed by knowing the maximum size of an item. One can allocate the maximum size for everything, but this gives alignment at the cost of empty-space. Other optimization techniques are even more complex, such as using pointers to additional structures (e.g., char arrays), impeding compiler array loop based vectorization, or other compiler optimizations.

Embodiments can optimize variable-width data or repetitive data with a relatively wide-storage for column-store database storage. An effect can be to minimize data storage requirements, and to significantly speed up search access patterns. This can speed up the user's ability to store the data they need and to be able to access and analyze it. Embodiments can provide a storage mechanism including a specified set of tables and a set of accompanying search and data access techniques. All or a portion of the specified tables can be optimized to use RAM (or other local memory, such as flash memory), and thus can be very space and time efficient. Embodiments can use a batch-storage OLAP (online analytical processing) data warehouse that utilize periodic downtime for data loading. Low-latency inserts may not required.

I. Storage Mechanism

Embodiments can use various tables to optimize the storage of data in columns. The first subsection below introduces a typical storage of variable character fields (varchars). The varchars are of variable length. The other subsections introduce new tables for optimizing the storage of data in columns. One such table is a dictionary table that stores unique varchars. Another table stores fixed-width data that references the dictionary table. This fixed-width storage can reduce storage costs, which can lead to faster access when the fixed-width table is stored in memory, as opposed to a hard drive.

A. Column Store

FIG. 1A shows a column 120 of a table 100 that may be improved with embodiments of the present invention. Table 100 shows varchar data as one would traditionally see it in a table. Array index 110 is implicit as the data is stored as an array, and thus each item implicitly is a new object with the next index number. In the example shown, the barcode data in column 120 corresponds to different colors. However, the varcars can be of any form, including phrases, sentences, paragraphs, and the like. Column 120 would typically be just one column of a larger table. And, real-world examples would have many more rows.

The storage requirements for column 120 are defined by the total number of rows (TR) and the number of average bytes per varchar ($\bar{x}_{BPV}$), which i corresponds to the average number of bytes in column 120 per row. The total storage requirement for column 120 is Total Bytes=$TR \times \bar{x}_{BPV}$.

B. Dictionary (Index)

The example table 100 in FIG. 1A is used to illustrate embodiments of the present invention. When data is stored as shown in column 120 of table 100, the length of column 120 can be quite long and complex. Pointers may be needed to identify when one varchar has ended and the varchar of another entry is to begin, e.g., when many words can appear in an entry. Column 120 could have a maximum length with empty space for entries having a shorter amount of text. A dictionary table that can be used to address problems in table 100 is now described.

FIG. 1B is a dictionary table 130 according to embodiments of the present invention. Array index 140 is implicit as the data is stored as an array, and thus each item implicitly is a new object with the next index number. Column 150 shows the unique varchars of column 120 in table 100. In this example, there are four unique varchars: blue, orange, red, and yellow.

A reference column 160 lists the array index 110 of table 100 in which the unique varchar appears. For example, the varchar "blue" appears only in the fifth entry of table 100, and thus has an array index of 5. Therefore, reference column 160 stores [5] at storage element 161. Since, the varchar "orange" appears in rows 1 and 3 of table 100, reference column 160 stores [1,3] to indicate both rows in which "orange" appears. Similarly, reference column 160 stores [4,6,7] for "red," since it appears in rows four, six, and seven in table 100.

As one can see, duplicate string values are grouped together with the original implicit array indices shown in the "Reference Keys" column 160. Unique varchar values are stored only once, and pointers (reference keys) are maintained to the individual occurrences in table 100.

The storage requirements for dictionary table 130 can be defined by the total number of rows (TR) in table 100, the number of unique rows (NUR) in table 130, and the average number of bytes per value calculated once per unique value ($\bar{x}_{BPVU}$), which is not weighted per occurrence in column 120. The storage requirement for column 150 is (NUR$\times\bar{x}_{BPVU}$).

The storage requirements for column 160 can be defined by the number of bytes used to store a reference key ($BPI_{rk}$). Each reference key points back to array index 110 of table 100 (i.e., the original array). Additionally, the storage requirements for column 160 can depend on the number of bytes needed to store an array pointer ($BPI_p$), e.g., when there is more than one reference key for a given varchar field value, as is shown for "orange" and "red."

Accordingly, the total bytes for dictionary table 130 can be provided by:

$$\text{Total Bytes} = (NUR \times \bar{x}_{BPVU}) + \left(NUR \times \frac{TR}{NUR} \times BPI_{rk}\right) + (NUR \times BPI_p).$$

Note that while the reference keys require extra storage space, they allow seamless travel from the dictionary storage mechanism to the actual rows in table 100. Thus, the dictionary itself can be interrogated by regular expressions or 'like' queries efficiently. The additional space required for the reference keys will in most cases be compensated for by the compression the dictionary creates, since most varchar data contains repetition.

For example, consider the structure defined by the following query:

select distinct Color
from MyColors
order by Color.

The query can be processed by accessing dictionary table 130 instead of table 100. The one or more distinct colors can be identified by analyzing column 150. Since the length of column 150 is less than the length of column 120, searching column 150 is more efficient. Once the selected colors are found, the reference keys can be identified and used to identify matching rows of table 100. Other data of table 100 besides that of column 120 can be retrieved based on the reference keys obtained from dictionary table 130. A use of a hash table can make searching column 150 even faster, and is described later.

C. Conversion to Fixed Column Store

The dictionary table 130 can be used to create a fixed-width table that effectively stores the same information as table 100. Instead of storing varchars, this new table can store array indexes 140 of table 130.

FIG. 1C is a reference store table 170 illustrating a reference store column 190 according to embodiments of the present invention. The values in reference store column 190 point into dictionary table 130, specifically pointing into the implicit array index 140 of dictionary table 130. Column 180 corresponds to the implicit array index, which has a same length as the original table 100.

Reference store column 190 will exist along with the rest of the columns in table 100, and will replace the original varchar data in column 120. This new structure simplifies the original implicit array index combined with a pointer into dictionary table 130, allowing for fixed-width column storage on the varchar field. The storage requirements for reference store column 190 is defined by the total number of rows (TR) and the number of bytes used to store a dictionary pointer ($BPI_{dp}$), providing Total Bytes=$TR \times BPI_{dp}$.

Reference store table 170 has a constant-column width for the length of the data table, which may be billions of rows long. A dense representation of unique values are stored elsewhere, namely dictionary table 130. Replacing variable length columns with fixed length references can save a lot of space especially if table 170 is in-memory (RAM/NAND). Further, in cases where repetition is high, this procedure for dictionary table 130 can provide a dictionary-storage based compression scheme for the varchar data, since only unique varchars are stored. Note that table 100 does not need to be stored, at least not column 120.

D. Creation Method

FIG. 2 is a flowchart of a method 200 for storing variable-width data in a database. Method 200 can be performed by a computer system that is in indication that the database. The computer system may be part of the database system. Method 200 can be performed by multiple nodes of a cluster, or each node stores part of a large table (e.g., certain rows of the large table).

At block 210, a first array of field values is received. For example, an array of varchar field values can be received as a column in a larger table. Each field value is associated with one first array index value of M possible index values, where M corresponds to a length of the first array. In the example of FIG. 1A, the first array index corresponds to column 110 and M equals seven. As mentioned above, a computer system can receive the first array for processing.

At block 220, field values that have a same unique field value are identified. In an example where the field values are varchars, the varchars can be analyzed using standard string comparisons. The first array has N unique first field values, where N is an integer greater than one. In the example of FIG. 1B, N would be four.

At block 230, a dictionary table that associates each unique field value with one or more reference keys is created. For each unique field value, each associated reference key can be a first array index corresponding to the respective unique field value. And, each unique field value can be associated with a dictionary array index value of N possible index values, where N is smaller than M. The dictionary table can be sorted.

In the example of FIGS. 1A and 1B, the reference keys are in column 160. The first array index corresponds to array index column 110. The dictionary array index corresponds to array index column 140, which is sorted alphabetically.

At block 240, a second array of fixed-width values is created. The fixed-width values correspond to the dictionary array index values. Each fixed-width value is associated with a second array index value that corresponds to a first array index value. In the example of FIG. 1C, the fixed-width values are in column 190. The second array index values correspond to array index column 140. As mentioned above, the second array can be part of a database table.

II. Compression

As mentioned above, embodiments can be used with varchars that are phrases, sentences, etc. Further, a compression table can be used to further identify words that repeat among entries.

Figure 3A:
FIG. 3A is a table 300 having a column 320 that includes phrases according to embodiments of the present invention.

FIG. 3A is a table 300 having a column 320 that includes phrases according to embodiments of the present invention. There are 6 entries as shown by array index 310. Some of the entries have just one word and other entries have multiples words, e.g., as put together in a phrase.

Figure 3B:
FIG. 3B is a dictionary table 330 according to embodiments of the present invention.

FIG. 3B is a dictionary table 330 according to embodiments of the present invention. Dictionary table 330 includes a column 350 composed of the varchar is from column 320 of table 300 according to embodiments of the present invention. The reference keys in column 360 correspond to array index 310. The unique character field values in column 350 are ordered alphabetically. The unique character field value ("hello") having a value of 2 for array index 340 as reference keys that identify rows 1, 3, and 5 as being the unique character field value "hello").

Some embodiments can further identify redundancies of words within phrases of column 350. Thus, there can also be the option to perform additional compression within the dictionary storage, for example, by identifying space separated text that repeat vertically across different entries. Additionally, embodiments can apply traditional compression mechanisms, such as Lempel-Ziv-Markov chain algorithm (LZMA), prediction by partial matching (PPMd), or others across the whole dictionary.

FIG. 4A shows a compression table 400 according to embodiments of the present invention. Compression table 400 has a column 420 composed of single words from the unique character field values of column 350 in FIG. 3B. Each word corresponds to a different array index 410 and has one or more associated reference keys in column 430. The reference keys in column 430 correspond to array index values in column 340. As one can see, certain unique word values can be found in multiple unique phrases.

Accordingly, embodiments can use dictionary compression to compress non-white space separated strings, as in FIG. 3B. And, embodiments can provide a second level of compression to compress words across white space separated words in a cell. For example, the word "the" is repeated in multiple unique entries in column 350 in this example. A compression table can be viewed as a particular type of a dictionary table.

FIG. 4B shows a reference store table 450 corresponding to dictionary table 330 according to embodiments of the present invention. The values in reference store column 470 point into dictionary table 330, specifically pointing into the implicit array index 340 of dictionary table 330. Column 460 corresponds to the implicit array index, which has a same length as the original table 300.

A query can be implemented by inspecting compression table 400 to identify a particular word in the query. If a match to the word is found, the corresponding reference keys can be used to identify rows in table 450 that contain the particular word. Such a search can efficiently identify such rows, and table 450 can use less storage space than table 400.

III. Search and Data Access Techniques

As described above, dictionary tables and compression tables can be used to assist in searches. Some embodiments can use hash tables to assist in searches, in conjunction with a dictionary table and/or a compression table. Thus, to support efficient query evaluation and execution, table described herein can have an accompanying hash-index applied to the varchar field value. This hash index can allow for 'equals to' style searches, as well as other searches.

A. Hash Tables

Figure 5:
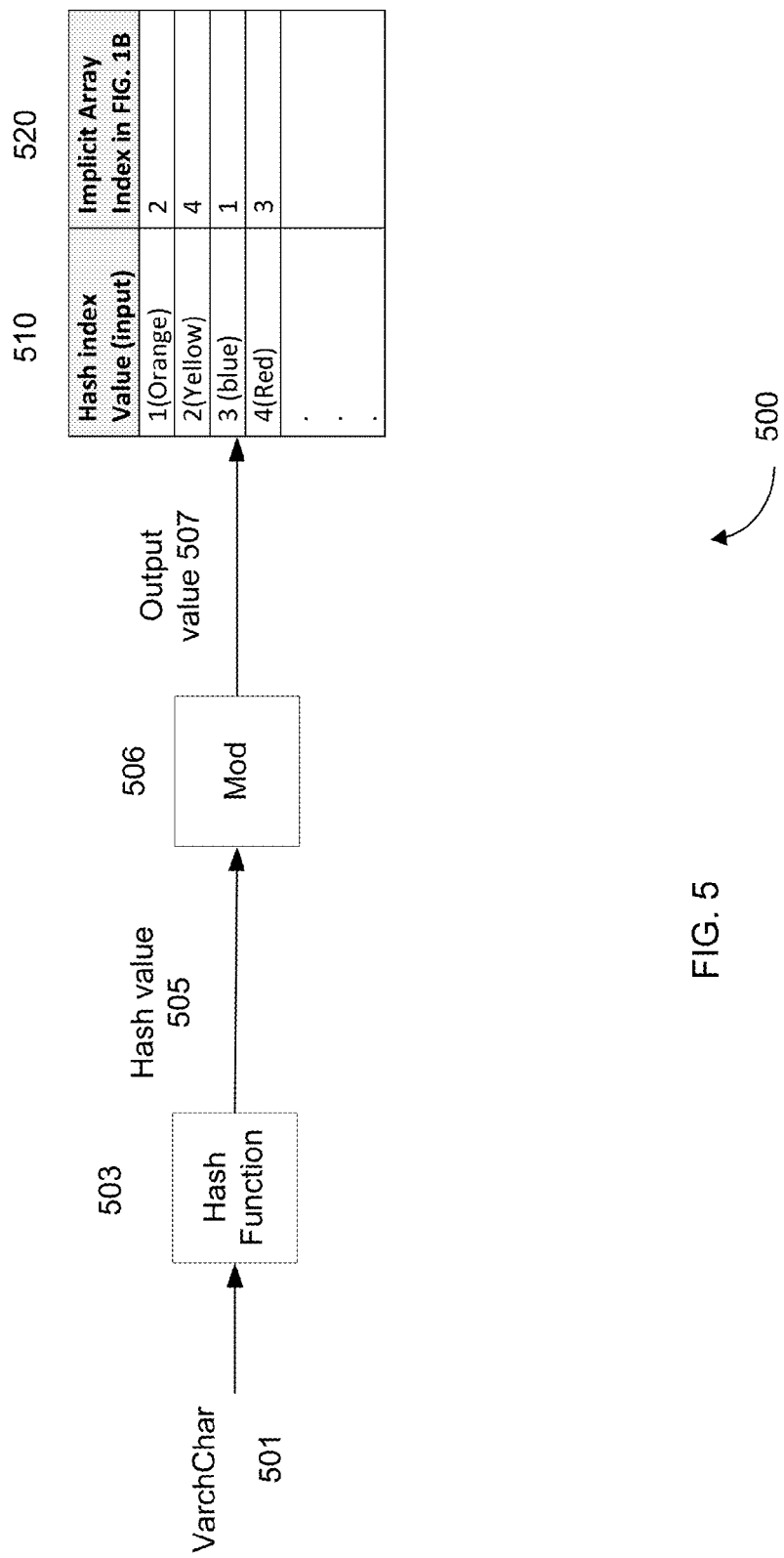
FIG. 5 shows a hash table according to embodiments of the present invention.

FIG. 5 shows a hash table 500 according to embodiments of the present invention. A hash function 505 can operate on a varchar 501 to provide a hash value 503. As the hash values may span a large range of numbers, a modulo 506 by the number of unique varchars can be applied to hash value 505 to obtain output value 507. As used herein, a hash function can include a modulo function to obtain an output value. As another example, applying a modulo function can be part of accessing the hash table with a hash value.

The output value 507 corresponds to an index value of hash table 500. The hash index values of table 500 are stored in column 510. For illustration purposes, the original values for the varchars of table 100 of FIG. 1A are shown in parentheses for four rows of hash table 500. Hash table 500 can include other values if other colors are used, as indicated by other possible TOWS.

Once output value 507 is identified in column 510, the corresponding array index value from column 520 can be identified. As examples, the array index value in column 520 can correspond to array index column 140 of table 130 or array index column 410 of table 400. As output value 507 corresponds to index value, the corresponding row can immediately be identified, and is an O(1) operation. In contrast, a search of the unique character field values of column 150 would be an O(log N) process, where N is the number of unique character field values. Such a O(log N) search can be a binary search.

The hash table (index) will add to the storage requirements. The storage requirements can be defined by the number of unique rows (NUR) and the number of bytes used to store an index value (e.g., 520) in a hash table (BPI). The total number of bytes can be provided by: Total Bytes=NUR×BPI$_i$. Examples of hash tables are described in Introduction to Algorithms 3$^{rd}$ Ed., by Cormen et al., 2009, pages 253-257.

B. Searches

Various queries can be utilize a hash table and a dictionary table. Some example access patterns include: Equals to; Greater Than X; Less Than Y; Values Between X and Y; and Like/regexp. The use of tables with these access patterns are discussed below.

For "Equals to," a hash function can be applied to the query term (e.g., a word or a phrase). The resulting hash output value can be checked against the hash table to see if there is a stored index value (e.g., whether there is a value stored in column 520). As not every row of table 500 may have a value stored in column 520 (e.g., the original table has no word was hash corresponds to that value), the hash table can be used to determine whether the crater even exists in the underlying table. If there is no corresponding value in column 520, then it can be determined that the query term does not exist. However, if there is a corresponding value in column 520, then it can be determined by the query term does exist in the underlying table. An "Equals to" operation can be performed in O(1) operations.

For "Greater Than X", the hash function can be applied to the query term X. The resulting hash output value can be checked against the hash table. A dictionary array index for the dictionary table can be obtained. If either the dictionary table or the hash table (or potentially both) are ordered, the character field corresponding to the dictionary array index in the character fields corresponding to values greater than the dictionary array index can be returned. For example, an access pattern of "Greater than Orange" can return "red" and "yellow." In some embodiments, if the hash output value does not have a corresponding value in column 520, a binary search can be performed of the dictionary table. On average a "Greater Than X" would take O(1+N/2) operations as half the values would be smaller and half the values would be greater.

For "Less Than Y," a similar operation as "Greater Than X" can be performed. The resulting hash output value can be checked against the hash table to obtain a corresponding array index value, and index values less than the corresponding array index value can be used to identify character field values to return. For example, an access pattern of "Less than Orange" can be performed by matching hash output value 507 to hash index value 88, thereby identifying array index 2. The array index 2 can be used to access dictionary table 130 for array indexes less than one, which would identify array index 1 that corresponds to "Blue." On average a "Less Than Y" would also take O(1+N/2) operations as half the values would be smaller and half the values would be greater.

For "Values Between X and Y," the access pattern can be performed as a combination of "Greater than X" and "Less than Y." On average a "Values Between X and Y" operation would take O(1+N/4) operations as a combination of N/2 and N/2 were provide N/4.

A "Like" access pattern can correspond to "*t*" that identifies character field values with the letter "t". Such an access pattern would not be able to use hash table 500. A "Like" access pattern would take O(N) operations, where N is a number of unique character field values. A "Like" access pattern can also be characterized as taking O(M) operations divided by the compression level, where M corresponds to a total number of rows in the underlying table. For "regexp," the order of operations depends on compression level and on the specific expression.

Evaluating a query involving fixed-with columns is not only space efficient, but it can result in more efficient evaluation of a query. For example, take the query: SELECT employee.id WHERE employee.first=employee.last. The output is a list of all employees that have the same first and last name. In this example, employee.first and employee.last are both wide data-type columns (varchar). These varchars can be stored in dictionary table, and they can be referenced by a hash index. If the hash value is the same for both employee.first and employee.last, the system immediately know that the strings are the same. If the hash value is not the same, the system immediately knows that the strings are not the same. This avoids the need to do a standard string comparison to determine if the two strings are equal.

C. Methods for Performing Query

Figure 6:
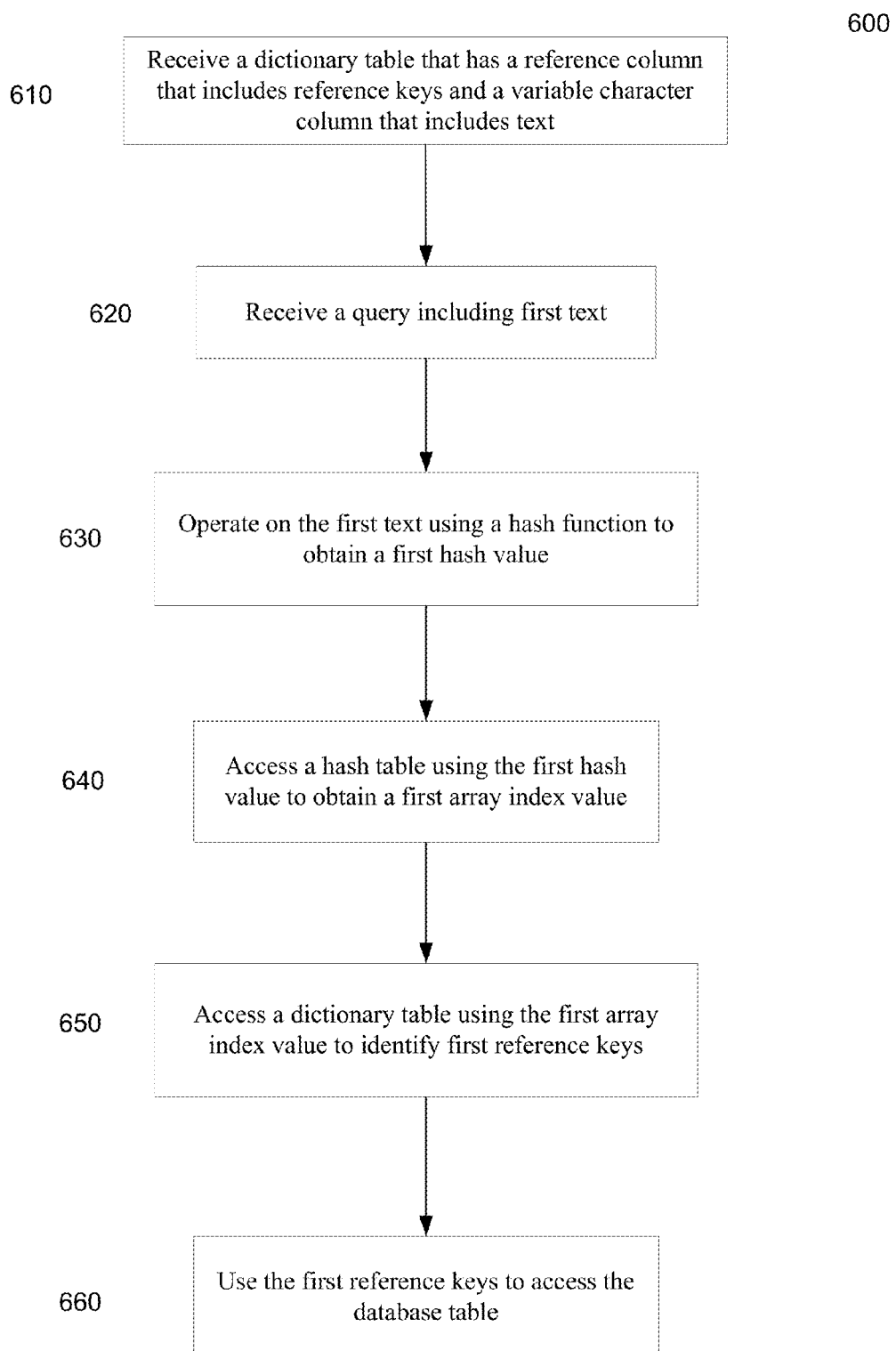
FIG. 6 is a flowchart of a method 600 for performing a database search according to embodiments of the present invention.

FIG. 6 is a flowchart of a method 600 for performing a database search according to embodiments of the present invention. Method 600 can use any dictionary table as described herein and any suitable hash table to efficiently perform a database search.

At block 610, a dictionary table is received. The dictionary table includes a reference column having reference keys and a variable character column having text. Table 130 of FIG. 1B, table 330 of FIG. 3B, and table 400 of FIG. 4A are examples of dictionary tables. A reference key of a row of the dictionary table identifies a row in a database table having matching text. The matching text in the database table can be identified by an index value of the dictionary table.

At block 620, a query including first text is received. The first text can be in many forms. For example, the first text can be a single word. As another example, the first text can be a phrase with spaces between words.

At block 630, a hash function can operate on the first text to obtain a first hash value. Any suitable hash function can be used. In some embodiments, the first hash value is unique to the first text. An example of a first hash value is hash output value 507 of FIG. 5.

At block 640, a hash table can be accessed using the first hash value to obtain a first array index value. As illustrated in FIG. 5, hash output value 507 can correspond to hash index value 88 in hash table 500. And, array index value 2 can be obtained. In some embodiments, the first array index value can be identified in a single operation.

At block 650, a dictionary table can be accessed using the first array index value to identify one or more first reference keys. The first array index value can correspond to a particular row of the dictionary table. The one or more first reference keys may or may not be from a row of the dictionary tables that has text matching the first text. For instance, the one or more first reference keys can be stored in the particular row when the text matches. For example, an array index value of 2 can be used to access dictionary table 130 to identify reference keys [1] and [3] that identify rows one and three of table 100 (or equivalently 170) as matching the first text (e.g., "Orange"). Such a search can be for an access pattern of "Equals to."

In another embodiment, the one or more first reference keys are not stored in the particular row. For instance, the query can includes an access pattern of: "Greater Than," "Less Than," or "Values Between." In such embodiments, the rows of the dictionary table can be ordered based on the text in the variable character column (e.g., ordered alphabetically). For "Greater Than," reference keys can be obtained in rows that have an array index value greater than the first array index value. For "Less Than," reference keys can be obtained in rows that have an array index value less than the first array index value.

At block 660, the one or more first reference keys are used to access the database table. In the example above, the reference keys [1] and [3] can be used to access rows 1 and 3 of the database table. Data from other columns can be obtained.

IV. Repetition for Fixed Width

Embodiments can be applied to such items as time, date, date/time, IP address information, and even float and double. Thus, embodiments are not limited to be limited to textual information. Items that are strictly not variable width are integer of any size, such as 2-byte integers and 8-byte integers. However, embodiments can be advantageously implemented with integers if there a significant amount of repetition among the integers or the integer data is analyzed in any way that would benefit from the structures described herein.

For example, there might have a column of 64-bit integers with a lot of repetition, which could now be handled perhaps even by a 1-byte integer in the column array holding the main table information (e.g., reference store column 190 of FIG. 1C. This could dramatically reduce the storage and increase the speed of analysis for such a column. Therefore, although embodiments may be well suited for variable-width data, embodiments can be extended over constant width data as well with great effect in some cases.

V. Storage Size Improvement

Below is a summary of storage size improvement. First, let us specify what the storage requirement when a varchar dictionary storage table is not used, and a hash table of the form in FIG. 5 is used. The original number of bytes of a column of variable character field values is given by:

$$\text{Original Bytes} = TR \times \bar{x}_{BPV} + TR \times BPI_{oi},$$

where TR is the total number of rows, $\bar{x}_{BPV}$ is the number of average bytes per varchar, and $BPI_{oi}$ is the number of bytes used to store an index entry in the hash table.

Here is the complete storage requirement when the varchar dictionary storage mechanism and an associated hash index is used:

$$\text{New Bytes} = (NUR \times \bar{x}_{BPVU}) + \left(NUR \times \frac{TR}{NUR} \times BPI_{rk}\right) + (NUR \times BPI_p) + (TR \times BPI_{dp}) + (NUR \times BPI_i),$$

which reduces to $$\text{New Bytes} = NUR \times \left(\bar{x}_{BPVU} + \frac{TR \times BPI_{rk}}{NUR} + BPI_p + \frac{TR \times BPI_{dp}}{NUR} + BPI_i\right)$$

To continue to reduce these equations, we need to make some assumptions for the various BPI terms. A reasonable assumption for many data sets is that $BPI_{dp}$ and $BPI_i$ can be 2-byte while $BPI_{rk}$ and $BPI_p$ may be 4-byte. In extremely large data sets, all of them may be 4-bytes, and in some extreme cases some may need to be 8-bytes. Using the middle of the road 4-byte option, we end up with:

$$\text{Original Bytes} = TR \times (\bar{x}_{BPV} + 4)$$

$$\text{New Bytes} = NUR \times \left(\bar{x}_{BPVU} + 8\left(\frac{TR}{NUR} + 1\right)\right)$$

One can see that the formula shifts the onus from Total Rows (TR) to Number of Unique Rows (NUR).

The following tables 1 and 2 compare the original storage required versus the storage required when using the varchar dictionary storage mechanism. The three rows are presented in each case:

1. Worst case (all unique varchar values)
2. Middle of the road case (50% unique varchar values)
3. A best case (a small fixed number of repeated values)

Assuming an average varchar value size of 10 ($\bar{x}_{BPVU}=10$) we can see:

TABLE 1

| Case | Original Storage (MB) | New Storage (MB) | Factor Change |
|---|---|---|---|
| 1E7 rows, all unique | 140 | 260 | 1.86 |
| 1E7 rows, consisting of 50% repeats | 140 | 170 | 1.21 |
| 1E7 rows, consisting of 100 unique values | 140 | 80 | 0.57 |

Assuming a more typical average varchar value size of 200 ($\bar{x}_{BPVU}=200$), there is considerable improvement in all but the worst case (which incurs only a small overhead of 120 MB).

TABLE 2

| Case | Original Storage (MB) | New Storage (MB) | Factor Change |
|---|---|---|---|
| 1E7 rows, all unique | 2040 | 2,160 | 1.06 |
| 1E7 rows, consisting of 50% repeats | 2040 | 1,120 | 0.55 |
| 1E7 rows, consisting of 100 unique values | 2040 | 80 | 0.04 |

Embodiments can allow for the varchar reference store (e.g., table 170) to be placed in the fastest tier of memory (e.g., RAM), and the dictionary table(s) can be placed on a secondary memory device (e.g., PCIe attached NAND). Many operations can take place (e.g., group by) on the reference store itself in RAM. The dictionary storage can be touched only when absolutely required (e.g., during a query with a where clause containing a 'like' operator), or of course at the end of a query when names, regions, or other qualitative information need to be returned to the user.

Some queries can be resolved without dereferencing the fixed size index. Just knowing the item is in the memory suffices (e.g., when a hash value matches in the hash table). Other queries may require the actual variable length object to be de-referenced so that it can actually be compared. For the example of the 'like' operator, one might have to see if a string is part of a larger string (not an exact match). If doing many Like or Regexp then may want dictionary, compression table, and hash table in memory as well.

VI. Computer System

Any of the computer systems mentioned herein may utilize any suitable number of subsystems. Examples of such subsystems are shown in FIG. 7 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 7 are interconnected via a system bus 75, which may be composed of multiples buses and one or more chipsets. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 977 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The communication between some subsystems can occur between via central processor 73, which can include a chipset. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of storing variable-width data in a database, the method comprising:
   receiving, with one or more processors, a first array of field values, wherein each field value is associated with one first array index value of M index values in a database table, M corresponding to a length of the first array of field values;
   identifying, with one or more processors, field values of the received first array of field values that have a unique field value from the database table, wherein the first array of field values has N unique field values, and wherein N is an integer greater than one and less than M;
   creating, with one or more processors, a dictionary table with at least N rows, each row associating one of the identified field values from the database table with one or more reference keys, wherein:
      for each of the identified field values of the received first array of field values, each of the one or more associated reference keys is an index value of the M index values in the database table corresponding to the identified field value, wherein at least one row of the dictionary table has more than one reference key, and each of the identified field values is further associated with a row index of the dictionary table;

creating, with one or more processors, a reference store table including a second array of fixed-width values and associated second array index values, each of the fixed-width values being one of the row indices of the dictionary table and being associated with a second array index value that corresponds to one of the first array index values of the database table;

receiving a query including first text;

operating on the first text using a hash function to obtain a first hash value;

accessing a hash table using the first hash value to obtain a corresponding row index of the dictionary table;

accessing the dictionary table using the corresponding row index to identify one or more first reference keys; and using the one or more first reference keys to access the database table or the first array of field values, wherein:
at least one of the second array of fixed-width values is part of the hash table,
the hash table has an ordered list of the fixed-width values at respective positions in the ordered list,
the position of a given fixed-width value in the ordered list corresponds to a hash function output based on a given unique field value in the first array of field values that is associated with reference keys in a given row of the dictionary table having the row index of the given fixed-width value, and
the method is performed by a computer system.

2. The method of claim 1, wherein the field values of the first array are character field values, the character field values being of variable length.

3. The method of claim 2, further comprising:
creating the hash table by operating on the identified field values with the hash function to obtain hash index values; and
for each hash index value corresponding to one of the identified field values, storing a dictionary array index value.

4. The method of claim 2, further comprising:
creating a compression table for the dictionary table by:
analyzing the character field values to obtain word values;
identifying unique words among the word values;
storing each unique word in a different row of a word column;
storing one or more third array index values associated with each unique word.

5. The method of claim 4, further comprising:
creating another hash table by operating on the unique words with the hash function or another hash function to obtain hash index values; and
for each hash index value corresponding to a unique word, storing a dictionary array index value.

6. The method of claim 1, comprising:
receiving another query having query text; and
identifying a row in the database table corresponding to at least part of the query text in an O(1) operation.

7. The method of claim 1, comprising:
receiving another query; and
identifying one or more rows in the database table based on the one or more rows having an associated row index that is greater than a row index associated with a content of the other query in an O(1+N/2) operation, where N is a number of unique character field values.

8. The method of claim 1, wherein:
receiving another query; and
identifying one or more rows in the database table based on the one or more rows having an associated row index that is between row indices associated with the other query in an O(1+N/4) operation, where N is a number of unique character field values.

9. The method of claim 1, wherein a number of rows of the dictionary table is less than a number of rows of the database table.

10. The method of claim 1, wherein a number of rows of the database table is the same as a number of rows of the reference store table.

11. A method of performing a database search, the method comprising:
obtaining, with a computer system, a dictionary table that has a reference column that includes reference keys and a variable character column that includes text, wherein each reference key of a row of the dictionary table identifies a row in a database table having matching text, and wherein at least one row of the dictionary table has more than one reference key;
receiving, with the computer system, a query including first text;
determining, with the computer system, a first hash value, the first hash value being based on the first text;
accessing, with the computer system, a hash table at a given position in the hash table specified by the first hash value to obtain a first array index value stored at the given position in the hash table, wherein:
the hash table includes an ordered list of items,
at least some of the items in the ordered list of the hash table associate a respective position in the ordered list with a respective row of the dictionary table, and
the respective row of the dictionary table identifies a row in the database table having matching text that hashes to the respective position in the ordered list of the hash table;
accessing, with the computer system, the dictionary table using the first array index value of the hash table to identify one or more first reference keys from the dictionary table; and
using the one or more first reference keys of the dictionary table to access the database table, wherein the query includes an access pattern of "Greater Than," wherein the rows of the dictionary table are ordered based on the text in the variable character column, and wherein accessing the dictionary table using the first array index value includes obtaining reference keys in rows that have an array index value greater than the first array index value.

12. The method of claim 11, wherein the first array index value corresponds to a particular row of the dictionary table.

13. The method of claim 12, wherein the one or more first reference keys are stored in the particular row.

14. The method of claim 12, wherein the one or more first reference keys are not stored in the particular row.

15. The method of claim 11, wherein the query includes an access pattern of "Equals to."

16. The method of claim 11, wherein the query includes an access pattern of: "Less Than" or "Values Between."

17. The method of claim 16, wherein the query includes an access pattern of "Less Than," and wherein the rows of the dictionary table are ordered based on the text in the variable character column, and wherein accessing the dictionary table using the first array index value includes:
obtaining reference keys in rows that have an array index value less than the first array index value.

18. The method of claim 11, wherein using the one or more first reference keys to access the database table comprises:
identifying a row in the database table corresponding to at least part of the first text in an O(1) operation.

19. The method of claim 11, wherein:
using the one or more first reference keys to access the database table comprises identifying one or more rows in the database table based on the one or more rows having an associated row index that is greater than a row index associated with the first text of the query in an O(1+N/2) operation, where N is a number of unique character field values.

20. The method of claim 11, wherein:
using the one or more first reference keys to access the database table comprises identifying one or more rows in the database table based on the one or more rows having an associated row index that is between row indices associated with the first text provided in the query in an O(1+N/4) operation, where N is a number of unique character field values.

21. The method of claim 11, wherein
a position of the items in the ordered list corresponds to a hash function output based on unique field values in a first array of field values of the database table.

22. A computer product comprising a computer readable medium storing a plurality of instructions for controlling a computer system to perform an operation of storing variable-width data in a database, the instructions comprising:
receiving a first array of field values, wherein each field value is associated with one first array index value of M index values in a database table, M corresponding to a length of the first array of field values;
identifying field values of the received first array of field values that have a unique field value from the database table, wherein the first array of field values has N unique field values, and wherein N is an integer greater than one and less than M;
creating a dictionary table with at least N rows, each row associating one of the identified field values from the database table with one or more reference keys, wherein:
for each of the identified field values of the received first array of field values, each of the one or more associated reference keys is an index value of the M index values in the database table corresponding to the identified field value, wherein at least one row of the dictionary table has more than one reference key, and
each of the identified field values is further associated with a row index of the dictionary table;
creating a reference store table including a second array of fixed-width values and associated second array index values, each of the fixed-width values being one of the row indices of the dictionary table and being associated with a second array index value that corresponds to one of the first array index values of the database table;
receiving a query including first text;
operating on the first text using a hash function to obtain a first hash value;
accessing a hash table using the first hash value to obtain a corresponding row index of the dictionary table;
accessing the dictionary table using the corresponding row index to identify one or more first reference keys; and
using the one or more first reference keys to access the database table, wherein:
at least one of the second array of fixed-width values is part of the hash table,
the hash table has an ordered arrangement of the fixed-width values at respective positions in the ordered list, and
the position of a given fixed-width value in the ordered arrangement corresponds to a hash function output based on a given unique field value in the first array of field values that is associated with reference keys in a given row of the dictionary table having the row index of the given fixed-width value.

23. The computer product of claim 22, wherein the field values of the first array are character field values, the character field values being of variable length.

24. The computer product of claim 23, wherein the instructions further comprise:
creating the hash table by operating on the identified field values with the hash function to obtain hash index values; and
for each hash index value corresponding to one of the identified field values, storing a dictionary array index value.

25. The computer product of claim 23, wherein the instructions further comprise:
creating a compression table for the dictionary table by:
analyzing the character field values to obtain word values;
identifying unique words among the word values;
storing each unique word in a different row of a word column;
storing one or more third array index values associated with each unique word.

26. The computer product of claim 25, wherein the instructions further comprise:
creating another hash table by operating on the unique words with the hash function or another hash function to obtain hash index values; and
for each hash index value corresponding to a unique word, storing a dictionary array index value.

* * * * *